United States Patent [19]

Sommers

[11] Patent Number: 5,569,440
[45] Date of Patent: Oct. 29, 1996

US005569440A

[54] PROCESS FOR THE REDUCTION OF CARBOCHLORINATION RESIDUE

[75] Inventor: James A. Sommers, Albany, Oreg.

[73] Assignee: Teledyne Industries, Inc., Albany, Oreg.

[21] Appl. No.: 305,555

[22] Filed: Sep. 14, 1994

[51] Int. Cl.⁶ ............................................. C01G 25/00
[52] U.S. Cl. ..................................... 423/79; 423/492
[58] Field of Search ....................... 423/79, 492, 60

[56] References Cited

U.S. PATENT DOCUMENTS

| | | | |
|---|---|---|---|
| 2,036,221 | 4/1936 | Kinzie | 423/79 |
| 2,847,316 | 8/1958 | Michel et al. | 423/492 |
| 3,156,527 | 11/1964 | Evans et al. | 423/79 |
| 3,495,936 | 2/1970 | Jones, Jr. | 423/492 |
| 3,883,636 | 5/1975 | Cole et al. | 423/79 |
| 4,442,076 | 4/1984 | Bonsack | 423/79 |
| 4,519,987 | 5/1985 | Robinson | 423/60 |
| 5,039,336 | 8/1991 | Feuling | 423/21.1 |
| 5,171,549 | 12/1992 | Walsh, Jr, et al. | 423/79 |

FOREIGN PATENT DOCUMENTS 50-91592  7/1975  Japan ................................. 423/492

*Primary Examiner*—Steven Bos
*Attorney, Agent, or Firm*—Shoemaker and Mattare, Ltd.

[57] ABSTRACT

An improved carbochlorination process for the production of volatile metal chlorides is disclosed. When chlorine gas contacts a metal oxide or a mixed metal oxide in a reaction zone in the presence of carbon at elevated temperatures, an undesirable carbochlorination residue forms containing carbon in the reaction zone. After the build-up of a carbochlorination residue in the reaction zone occurs, the volume of the carbochlorination residue in the reaction zone is reduced by periodically introducing just chlorine and metal oxide or mixed metal oxide reactants into the reaction zone without introducing any additional carbon. These components react with a portion of the carbon in the carbochlorination residue so as to reduce the amount of the residue.

4 Claims, No Drawings

PROCESS FOR THE REDUCTION OF CARBOCHLORINATION RESIDUE

FIELD OF THE INVENTION

The present invention relates to the carbochlorination processes generally and more particularly in the use of such processes for the production of zirconium metal, and most particularly, to the reduction in carbon-containing residue which results from the practice of the carbochlorination process with zircon sand.

BACKGROUND OF THE INVENTION

The carbochlorination of refractory, zirconium-containing ores such as zircon ($ZrSiO_4$) inevitably generates inside the chlorination reactor a normally unreactive residue, which builds up to slowly fill the reactor. This material must be periodically removed, interrupting production. Furthermore, once removed, this material is radioactive due to involatile, naturally-occurring radionuclides such as radium and thorium. Therefore, it must be stored, handled and disposed of as radioactive waste. Such measures are costly. Also, the largest fraction of the residue is unreacted carbon, which is by itself an innocuous material, which can still have chemical reduction and energy values. In present practice, a large amount of costly waste disposal volume is taken up by this carbon.

OBJECTS OF THE INVENTION

The object of this invention is to provide a process to lower the amount of zircon carbochlorination residue which requires disposal as radioactive waste.

It is a further object of the present invention to provide such a process which requires a minimum of extraneous chemicals or equipment for the further treatment of the residue.

A further object of the present invention is to provide such a process while minimizing disruption of current production activity.

A further object is to reduce personnel exposure to radioactive materials present in the carbochlorination residue.

A still further objective is to provide such a process where some of the remaining reduction value of the presently-discarded carbon in the residue is utilized.

SUMMARY OF THE INVENTION

All of the foregoing objects and advantages are realized by the present invention which includes the steps of adding reducible zirconium compounds containing oxygen to the chlorination containing residue from prior carbochlorination reactions and continue chlorination under carbochlorination conditions to produce zirconium metal chlorides while reducing the volume of the prior produced residue.

The addition of a chlorinatable zirconium compound or mixtures of compounds containing oxygen while not normally expected to react with the spent carbon-containing residue of prior carbochlorination reactions does in fact react in a manner which produces further zirconium chloride while reducing the amount of carbon in the residue in the reactor. The volume of waste generated by the prior carbochlorination is reduced easing the problem of further handling and disposal.

It has been discovered that this carbon, although not reactive in the residue, is nevertheless reactive with an easier-to-chlorinate oxide, such as $ZrO_2$. Therefore, by adding $ZrO_2$ to a reactor which has an inventory of residue from the prior chlorination operation, the residue amount is decreased while useful product $ZrCl_4$ is simultaneously generated.

DETAILED DESCRIPTION OF THE INVENTION

In the past, carbochlorination residue has been dealt with most often by simply packaging and shipping the residue removed from the reactor to a disposal site. However, costs of such disposal have been rising rapidly and all indications are that they will continue to rise.

A further way to deal with the carbon-containing residue is to combust the carbon away with air and thereby achieve a reduction in the volume of residue. However, the residue is normally quite resistant to oxidation. Also, the reaction of water vapor in the air with the chloride salts gives rise to hydrogen chloride (HCl), which is highly toxic and corrosive to process equipment. Likewise, the coke originally charged to the reactor normally has a sulfur content, which in combustion tends to be liberated as sulfur trioxide. This requires that a large amount of lime be fed to the combustor to neutralize and trap these acidic components. The combustion further generates a radioactive ash which must be confined. All these factors combine to drive up the capital and operating costs of a combustion apparatus for the carbochlorination residue.

Another way to deal with the carbochlorination residue is to use aqueous processing to dissolve the salts, isolate the solution which now contains some of the radioactive components, and subsequently treat it for suitable disposal. It is then possible to treat the solids fraction in another manner such as combustion, to recover some of the coke and zircon values. Some elements of this process are described in U.S. Pat. No. 5,039,336.

This process, however, has some drawbacks: Once the residue is contacted with water, the radioactive elements largely dissolve, giving a now-radioactive aqueous stream. Spills from such a stream are very consequential for entry to other water sources, and so very rigorous measures are needed to insure against such incidents. Such liquors often have relatively high radioactivity levels of radium per liter, meaning that spills of small quantities could contaminate to above drinking water standards. Measures to guard against such incidents are expensive. Furthermore, once radium has been solubilized (and therefore mobilized), it must be rigorously sequestered in succeeding steps, including a co-precipitation with $BaSO_4$. It must be further processed for radioactive waste disposal.

Further, the expected behavior of the residue after such an aqueous contacting step is that it chlorinate thoroughly upon its return the chlorinator. This may not happen, for example, if the coke or zircon was a fraction which is inherently unreactive. In such a case, this fraction will not be consumed and the amount of residue will continue to increase.

The difficulties encountered in the prior industrial practices described for treating residue can be avoided by the practice of the present invention.

Carbochlorination of zircon sand proceeds at temperatures of 900°–1200° C. according to the reaction:

$$ZrSiO_4 + 2-4C + 4Cl_2 \rightarrow ZrCl_4 + SiCl_4 + CO + CO_2$$

Therefore, nearly all of the zircon in theory is chlorinated away. However, normal commercial zircon sand contains impurity elements, either as grains of other kinds of sand with which it occurs in nature, as well as those inevitable impurity elements which are in solid solution in the zircon crystal lattice. Many of these, such as alkali, alkaline earth and rare earth elements, along with thorium and radium, have chlorides which are relatively involatile and therefore tend to remain in the chlorination bed. It is widely believed that these chlorides together tend to form a molten salt mixture which coats the unreacted feed mix, making it unreactive. A known feature of residue is that despite the presence of both unreacted zircon and coke, it is resistant to further chlorination under the conditions described. These features of residue have also been described in U.S. Pat. No. 5,039,336. A very significant feature of the residue is that the radioactivity due to naturally-occurring radionuclides, mostly thorium, and radium, now concentrated, are present in the residue and require it to be handled, stored and disposed of as radioactive waste. This can be a significant disposal problem as well as a significant element of overall process cost. Recently mounting costs and shortage of such disposal space have forced attention on the desirability to lowering waste volume.

Residue is difficult to characterize fully, however it can be described as being mostly or substantially carbon with some zircon and miscellaneous formed salts.

As previously described, the volume of carbon in the disposed residue makes a reduction in that component desirable.

In conducting zircon chlorination operations, it is known that after a certain interval of feeding a ground mixture of coke and zircon to a fluid bed reactor, together with chlorine gas, an intolerable volume of residue has accumulated. The operation of removing it, known as a residue pull, is time-consuming, hazardous, and interruptive of production. The residue is allowed to flow from the bottom of the reactor into receptacles where it cools. Personnel in attendance must have proper thermal and radiological protection. All these factors dictate that the frequency of pulls and their amount be as small as possible.

A specific embodiment of the present invention is described hereinafter. Normal carbochlorination of zircon operations is carried out to the point where an accumulation of residue has occurred. Specifically, a mixture of milled zircon sand plus coke is fed to a fluidized bed chlorinator, the fluidization being maintained by the chlorine gas fed to the bottom of the bed. After an interval, the pressure drop across the bed will increase providing evidence of an increased inventory of solids therein. At this time, the previous feed of zircon plus coke is suspended and replaced by $ZrO_2$, or baddeleyite fed or mixtures including zircon in such predetermined amounts as to keep the $ZrCl_4$ production rate at some desired level. Chlorine feed rate is maintained at that equal to the stoichiometric ratio of the $ZrO_2$ or mixed oxide. The $ZrO_2$ reacts with coke, which is the largest part of the residue, simultaneously consuming it and generating product $ZrCl_4$.

The following examples further describe the process of the present invention.

EXAMPLE I

A composite residue sample (composed of several residue pulls) from commercial zircon carbochlorination operations was obtained and removed to a laboratory dry box to preserve its anhydrous condition. Chlorination of small samples in boats inside a quartz tube at 1050° C. was done by flowing chlorine gas at 60 mL/min for two hours. At the end of this interval, the tube was cooled and the boat, as well as the tube, in which chlorination products (mostly $ZrCl_4$) were condensed, were weighted. From experience, we know that such an arrangement captures virtually all of the $ZrCl_4$ and none of the $SiCl_4$. The boat contents were sand chlorination residue (SCR) and additives, the latter being either $ZrO_2$ or zircon flour. Thus, these experiments mimic the effect of in-reactor treatments to a bed of SCR, said treatments being undertaken to lower the amount of the SCR.

TABLE 1

| Run | Additive | Mass Additive/ Mass SCR | net weights IN | g OUT | weight of products | reduction g factor* |
|---|---|---|---|---|---|---|
| 1 | none | 0 | 4.00 | 3.36 | 0.52 | 1.2 |
| 2 | $ZrO_2$ | 3 | 5.00 | 0.40 | 7.42 | 2.6 |
| 3 | $ZrO_2$ | 3.5 | 5.00 | 0.38 | 7.33 | 2.4 |
| 4 | $ZrO_2$ | 4 | 5.00 | 0.28 | 7.69 | 3.0 |
| 5 | zircon flour | 3 | 5.00 | 1.54 | 3.65 | — |

*defined as = (weight IN) × (3.36/4.00) × (1/(1 + ($m_{add}/m_{SCR}$))(weight OUT)$^{-1}$ The results of several runs performed as described are summarized in Table 1.

The results in Table 1 show that there is a small tendency to chlorinate the supposedly unreactive residue, under the conditions of the experiments. (Run 1 is a blank intended to correct for this.) The amount of chlorination observed, a weight loss of 100(1−(3.36/4.00))=16%. This factor has been used to adjust the amount of residue in the boat to an unchlorinatable fraction in the reduction factor calculations.

By adding $ZrO_2$, (runs 2,3,4) we can make use of the coke in the SCR while simultaneously eliminating residue, as well as, generating useful $ZrCl_4$. The radionuclides in the residue have been concentrated by a factor equal to the reduction factor, but is still easily within the category of low-level waste. The amount of residue which must be disposed of is less by the reduction factor.

By adding zircon, (run 5) some reduction is achieved. We estimate that 40% of the residue was consumed by this measure. This is considered potentially useful since zircon is the material choice for commercial production.

EXAMPLE II

Zircon sand and petroleum coke were co-milled to a level of about 20 weight percent carbon and this feed mixture was fed together with chlorine gas to a bank of five production chlorinators of identical design on a continuous basis for a period of several weeks. Product $ZrCl_4$ was condensed, collected and weighed as the primary product of this operation. Periodically, according to operating conditions, the undesirable residue was removed from the reactor and weighed. All five of the reactors were given the same feed. Reactor E, the test reactor, was operated in a slightly different manner, in that a certain amount of zircon sand, in the form of milled flour, was added to the feed hopper according to the following schedule. Following a residue removal, the chlorinator was fed as normal until about 10,000 lb of product $ZrCl_4$ had been collected. At that time, 500 lb of zircon flour was added to the feed hopper. Thereafter, 500 lb of zircon flour was added to the feed hopper after each further 5,000 lb of $ZrCl_4$ was generated. About 18,000 lb of zircon flour was added to chlorinator E over the period of the test. The production figures for $ZrCl_4$ and residue are shown for the reactors are shown below:

| Reactor Designation | lb $ZrCl_4$ | lb residue | lb $ZrCl_4$/lb residue |
| --- | --- | --- | --- |
| A | 270,378 | 11,387 | 23.7 |
| B | 316,115 | 17,523 | 18.0 |
| C | 249,489 | 10,395 | 24.0 |
| D | 279,880 | 14,759 | 19.0 |
| E | 331,904 | 7,074 | 46.9 |

The test reactor more than doubled the product/residue ratio of the average non-test reactors.

It is contemplated that mixtures of zirconium compounds containing oxygen, including mixtures of $ZrO_2$ and zircon sand will also provide substantial reductions in the volume of chlorinator residue thereby achieving the objectives of the present invention.

This invention has been described with respect to the best modes contemplated for its practice and it will be appreciated that variations in the operating conditions and materials utilized are possible and are included in the scope of the appended claims as limited only by the applicable prior art.

I claim:

1. In a carbochlorination process for the production of volatile metal chlorides wherein chlorine gas contacts zirconium oxides in a reaction zone in the presence of carbon at elevated temperatures and builds up a carbochlorination residue containing carbon in the reaction zone, the improvement comprising reducing the volume of the carbochlorination residue in the reaction zone by periodically introducing, after the build up of a carbochlorination residue in the reaction zone, zirconium oxide or zircon into the reaction zone without introducing any carbon, to thereby react the carbon in the carbochlorination residue with the zirconium oxide or zircon.

2. The process of claim 1, wherein after the periodic introduction of zirconium oxide or zircon sand into the reaction zone the carbochlorination reaction is continued.

3. The process of claims 1 or 2, wherein the reaction zone is maintained at a temperature of from about 900° C. to about 1200° C.

4. The process of claims 1 or 2, wherein the zirconium oxide is baddeleyite.

\* \* \* \* \*